(12) United States Patent
Lee et al.

(10) Patent No.: US 11,394,052 B2
(45) Date of Patent: Jul. 19, 2022

(54) COMPOSITE CATHODE AND LITHIUM-AIR BATTERY INCLUDING THE SAME

(71) Applicant: SAMSUNG ELECTRONICS CO., LTD., Suwon-si (KR)

(72) Inventors: Dongjoon Lee, Suwon-si (KR); Mokwon Kim, Suwon-si (KR); Sangbok Ma, Suwon-si (KR); Jungock Park, Yongin-si (KR); Heungchan Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 336 days.

(21) Appl. No.: 16/594,369

(22) Filed: Oct. 7, 2019

(65) Prior Publication Data

US 2020/0112054 A1 Apr. 9, 2020

(30) Foreign Application Priority Data

Oct. 8, 2018 (KR) .......................... 10-2018-0119962

(51) Int. Cl.
*H01M 10/0562* (2010.01)
*H01M 10/0525* (2010.01)
(Continued)

(52) U.S. Cl.
CPC ..... *H01M 10/0562* (2013.01); *H01M 4/8615* (2013.01); *H01M 4/8657* (2013.01); *H01M 10/052* (2013.01); *H01M 10/056* (2013.01); *H01M 10/0525* (2013.01); *H01M 12/08* (2013.01); *H01M 50/409* (2021.01); *H01M 50/46* (2021.01); *H01M 4/0447* (2013.01); *H01M 10/0565* (2013.01);
(Continued)

(58) Field of Classification Search
CPC ......... H01M 10/0562; H01M 10/0525; H01M 4/0447
See application file for complete search history.

(56) References Cited

U.S. PATENT DOCUMENTS 6,210,832 B1  4/2001  Visco et al.
8,293,143 B2  10/2012  Chartier et al.
(Continued)

FOREIGN PATENT DOCUMENTS

JP   2017-0176612 A   4/2017
KR   20160025287 A    3/2016

OTHER PUBLICATIONS

Dipan Kundu et al.,: "A highly active nanostructured metallic oxide cathode for aprotic Li-O2 batteries", ENERGY & Environmental Science, vol. 8, No. 4, Dec. 22, 2014, pp. 1292-1298.
(Continued)

*Primary Examiner* — Matthew J Merkling
(74) *Attorney, Agent, or Firm* — Cantor Colburn LLP

(57) ABSTRACT

A composite cathode including: a cathode conductor layer including a mixed conductor; and a cathode junction layer adjacent to the cathode conductor layer, the cathode junction layer including a solid electrolyte, wherein the mixed conductor has a lithium-ion conductivity and an electrical conductivity, and wherein the solid electrolyte has a lithium-ion conductivity. In addition, the present disclosure provides a lithium-air battery including the composite cathode.

22 Claims, 2 Drawing Sheets

(51) Int. Cl.
*H01M 50/46* (2021.01)
*H01M 50/409* (2021.01)
*H01M 4/86* (2006.01)
*H01M 10/052* (2010.01)
*H01M 10/056* (2010.01)
*H01M 12/08* (2006.01)
*H01M 4/04* (2006.01)
*H01M 50/411* (2021.01)
*H01M 10/0565* (2010.01)
*H01M 50/431* (2021.01)
*H01M 50/446* (2021.01)

(52) U.S. Cl.
CPC ........ *H01M 50/411* (2021.01); *H01M 50/431* (2021.01); *H01M 50/446* (2021.01); *H01M 2300/0071* (2013.01); *H01M 2300/0082* (2013.01); *H01M 2300/0091* (2013.01); *Y02E 60/10* (2013.01)

(56) References Cited

U.S. PATENT DOCUMENTS

| | | |
|---|---|---|
| 9,954,213 B2 | 4/2018 | Roumi |
| 2016/0064732 A1* | 3/2016 | Copley ................. H01M 4/485 429/405 |
| 2016/0064785 A1 | 3/2016 | Kim et al. |

OTHER PUBLICATIONS

European Search Report for European Patent Application No. 19201653.3 dated Feb. 28, 2020.

* cited by examiner

COMPOSITE CATHODE AND LITHIUM-AIR BATTERY INCLUDING THE SAME

CROSS-REFERENCE TO RELATED APPLICATION

This application claims priority to and the benefit of Korean Patent Application No. 10-2018-0119962, filed on Oct. 8, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a composite cathode and a lithium-air battery including the same.

2. Description of the Related Art

A lithium-air battery may include an anode capable of storing/discharging lithium ions, a cathode for oxidizing/reducing oxygen in the air, and a lithium-ion-conductive medium interposed between the cathode and the anode.

A lithium-air battery uses a lithium metal electrode as a cathode and air may not need to be stored as a cathode active material in the battery, such that a high-capacity battery may be realized. Lithium-air batteries have a theoretical energy density of at least 3,500 watt-hours per kilogram (Wh/kg), and an energy density of about 10 times or more that of general lithium-ion batteries.

A lithium-air battery may include a porous carbon-based material as a cathode material, and an electrolyte. Such a lithium-air battery generates $CO_2$ by the reaction of a carbon-based material with oxygen during repeated charging and discharging processes. Thus, the lifetime characteristics of the lithium-air battery deteriorate.

Therefore, there is a demand for cathodes applicable to lithium-air batteries, which may replace cathodes that include a porous carbon-based material.

SUMMARY

Provided is a composite cathode including a cathode conductor layer having ionic conductivity and electrical conductivity and a cathode junction layer adjacent to the cathode conductor layer.

Provided is a lithium-air battery including the composite cathode.

Additional aspects will be set forth in part in the description which follows and, in part, will be apparent from the description, or may be learned by practice of the presented embodiments.

According to an aspect of an embodiment, a composite cathode includes: a cathode conductor layer including a mixed conductor; and a cathode junction layer adjacent to the cathode conductor layer, wherein the cathode junction layer includes a solid electrolyte, the mixed conductor has lithium-ion conductivity and electrical conductivity, and the solid electrolyte has lithium-ion conductivity, and a lithium-air battery includes the composite cathode.

According to an aspect of another embodiment, a lithium-air battery includes: a composite cathode including a cathode conductor layer and a cathode junction layer, wherein the cathode conductor layer includes a mixed conductor having lithium-ion conductivity and electrical conductivity, and the cathode junction layer is adjacent to the cathode conductor layer and includes a solid electrolyte; an anode; and an oxygen-blocking film adjacent to the anode, wherein the cathode junction layer has lithium-ion conductivity.

According to an aspect, a composite cathode, includes: a cathode conductor layer including a mixed conductor; and a cathode junction layer adjacent to the cathode conductor layer, the cathode junction layer including a solid electrolyte, wherein the mixed conductor has a lithium-ion conductivity, the solid electrolyte has a lithium-ion conductivity.

According to an aspect, a lithium-air battery includes: a composite cathode including a cathode conductor layer and a cathode junction layer, wherein the cathode conductor layer includes a mixed conductor having a lithium-ion conductivity and an electrical conductivity, and the cathode junction layer is adjacent to the cathode conductor layer and includes a solid electrolyte; an anode; and an oxygen-blocking film adjacent to the anode, wherein the cathode junction layer has a lithium-ion conductivity.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
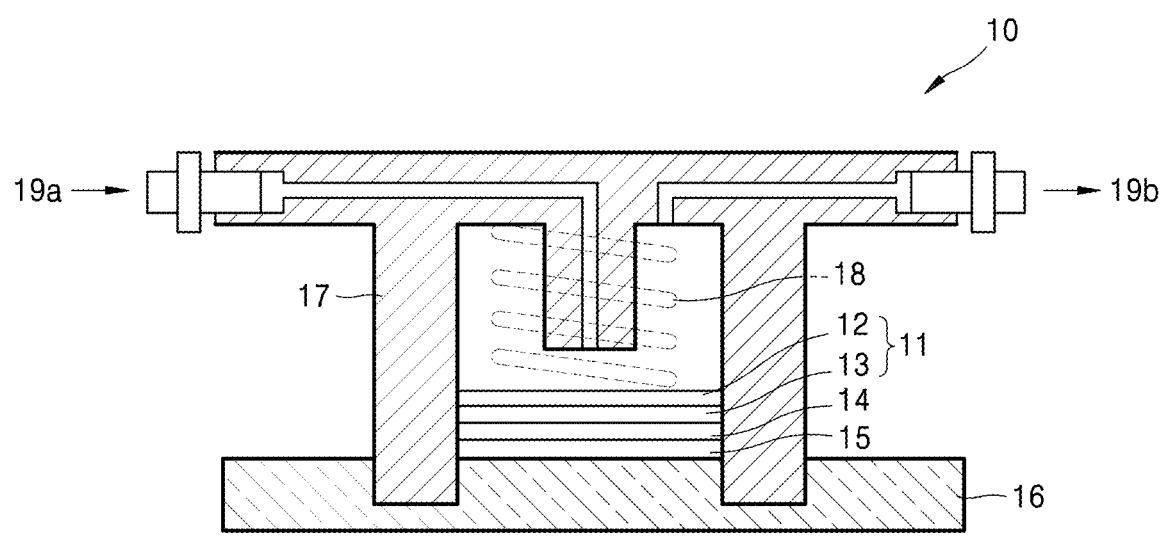
FIG. 1 is a schematic cross-sectional view illustrating the structure of a lithium-air battery according to an embodiment.

The present disclosure, described below, may be variously modified and may have various shapes, so examples of which are illustrated in the accompanying drawings and will be described in detail with reference to the accompanying drawings. However, it should be understood that the exemplary embodiments according to the concept of the present disclosure are not limited to the embodiments which will be described hereinbelow with reference to the accompanying drawings, but various modifications, equivalents, additions and substitutions are possible, without departing from the scope and spirit of the present disclosure.

The terminology used herein is for the purpose of describing particular embodiments only and is not intended to restrict the present disclosure. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. As used herein the term "/" may be interpreted as "and" or "or" depending on the situation.

In the drawings, diameters, lengths, and thicknesses are enlarged or reduced in order to clearly illustrate various components, layers, and regions. Like reference numerals refer to like elements throughout the specification. It is to be understood that when a layer, film, region, plate, or the like is referred to as being "on" or "on" another portion throughout the specification, this includes not only the case directly above another portion but also the case where there is another portion in between.

Although the terms first, second, etc. may be used herein to describe various elements, these elements should not be limited by these terms. These terms are only used to distinguish one element, from another element. In the drawings, some of the elements may be omitted, but this is not intended to exclude the omitted elements but intended to facilitate an understanding of the features of the present disclosure.

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite cathode and a lithium-air battery including the same according to embodiments will be described in more detail.

According to an embodiment, a composite cathode includes: a cathode conductor layer including a mixed conductor; and a cathode junction layer adjacent to the cathode conductor layer, wherein the cathode junction layer includes a solid electrolyte, the mixed conductor has lithium-ion conductivity, e.g., ionic conductivity, and electrical conductivity, and the solid electrolyte has lithium-ion conductivity e.g., ionic conductivity. In an aspect, the solid electrolyte is an electrical insulator, e.g., has insignificant electrical conductivity.

Here, the term "mixed conductor" refers to a compound having both a lithium-ion conductivity and an electrical conductivity. In this regard, the mixed conductor will be described in below in detail.

In a lithium-air battery using a porous carbon-based material as a cathode material, carbon dioxide ($CO_2$) may be generated by the competitive reaction of oxygen radicals with lithium ions and a carbon-based material. Further, in the cathode structure of a lithium-air battery, an ion conductive film may be disposed on the surface of a carbon-based material as an electron conductor, and in this case, the oxidation/reduction reaction of lithium and oxygen may be performed at the interface between the carbon-based material and the ion conductive film. As a result, gaps (cracks) are generated between the carbon-based material and the ion conductive film due to repetitive charging and discharging, so that ionic conductivity deteriorates and thus cell characteristics deteriorate. In contrast, since the composite cathode according to an embodiment of the present disclosure does not use a porous carbon-based material, carbon dioxide ($CO_2$) is not generated, and a cathode conductor layer having both ionic conductivity and electrical conductivity is formed as a single layer, so that the generation of cracks in the cathode is prevented, with the result that the charging and discharging characteristics and durability of a cell are improved.

In the composite cathode according to an embodiment, the cathode junction layer serves as a lithium ion path, so that lithium ions may be easily introduced into the cathode conductor layer, and electrons generated from the anode may also be introduced into the cathode conductor layer having electrical conductivity. Consequently, a plenty amount of lithium ions and electrons supplied to the cathode conductor layer react with oxygen (that is, a cathode active material) supplied from the outside on the surface of the cathode conductor layer to precipitate a discharge product (that is, lithium oxide). As a result, the cracks of the cathode conductor layer are minimized or prevented, and thus the durability of the cathode may be improved.

The cathode junction layer and the cathode conductor layer may be disposed to be in contact with each other. For example, the cathode junction layer and the cathode conductor layer may be obtained by a layer by layer ("LBL") coating method. The mixed conductor included in the cathode conductor layer and the solid electrolyte included in the cathode junction layer are strongly bound to each other by electrostatic attraction, and thus the separation of the cathode conductor layer and the cathode junction layer due to discharge products during the charging and discharging process of the lithium-air battery may be suppressed. Therefore, the increase in resistance between the cathode conductor layer and the cathode junction layer may be suppressed, and the charging and discharging characteristics may be improved.

The cathode junction layer may have a multilayer structure. For example, the cathode junction layer may be a film in which a plurality of layers having lithium-ion conductivity are laminated. In this case, the materials of the cathode junction layer, included in the plurality layers, may be the same as or different from each other, and may be used without limitations so long as the materials of the cathode junction layer, included in the plurality layers, have lithium-ion conductivity.

The cathode junction layer may be thinner than the cathode conductor layer. Since the cathode junction layer is introduced to decrease the interface resistance between the cathode junction layer and the oxygen-blocking film, when the cathode junction layer is thicker than the cathode conductor layer, the film resistance of the cathode junction layer itself may increase, and thus it may be difficult to decrease the interface resistance of the cathode conductor layer.

For example, the thickness of the cathode junction layer may be about 0.1 micrometers (μm) to about 5 μm. For example, the thickness of the cathode junction layer may be about 0.1 μm to about 4 μm. For example, the thickness of the cathode junction layer may be about 0.1 μm to about 3 μm. For example, the thickness of the cathode junction layer may be about 0.1 μm to about 2 μm. For example, the thickness of the cathode junction layer may be about 0.1 μm to about 1 μm. For example, the thickness of the cathode junction layer may be about 0.1 μm to about 0.5 μm. When the thickness of the cathode junction layer is less than 0.1 μm, the cathode junction layer is extremely thin, so that the contact property between the cathode conductor layer and the oxygen-blocking film may deteriorate due to the roughness of the cathode conductor layer and the oxygen-blocking film. When the thickness of the cathode junction layer is more than 5 μm, an effect of reducing the interface resistance may not be sufficient due to an increase in film resistance of the cathode junction layer itself.

The cathode junction layer may be porous. When the cathode junction layer has porosity, the weight thereof decreases, and thus the capacity value of a cell per weight may increase. For example, the cathode junction layer may be formed by melting and cooling an inorganic compound, and may have a porous structure during a sintering process.

Alternately, the cathode junction layer may be substantially non-porous. The cathode junction layer may have a dense structure in which pores are not intentionally introduced. However, the cathode junction layer may have permeability to oxygen. For example, the cathode junction layer may be formed by applying a polymer solution on a substrate and then drying the polymer solution.

The cathode conductor layer may be carbon-free. Since the cathode conductor layer does not include a carbon material, the generation of carbon dioxide ($CO_2$) may be prevented, and thus stability may be improved.

The cathode conductor layer may be porous. The cathode conductor layer may be formed by mixing the mixed conductor with a binder and a solvent to form a slurry and then sintering the slurry to remove the binder and the solvent. The cathode conductor layer having porosity is formed by removing the binder and the solvent through a sintering process. When a discharge product is precipitated in the pores of the cathode conductor layer, it is possible not only to effectively alleviate the volume change of the cathode conductor layer but also to ensure a firm contact with the adjacent layer.

The cathode conductor layer may be a single layer. Accordingly, since products generated during charging and discharging processes may be precipitated on the surface of the cathode conductor layer, the cracks of the cathode conductor layer may be prevented by the precipitation of the discharge products, so that cycle characteristics may be improved.

For example, the thickness of the cathode conductor layer may be about 6 μm to about 15 μm. For example, the thickness of the cathode conductor layer may be about 7 μm to about 15 μm. For example, the thickness of the cathode conductor layer may be about 8 μm to about 15 μm. For example, the thickness of the cathode conductor layer may be about 9 μm to about 15 μm. For example, the thickness of the cathode conductor layer may be about 10 μm to about 15 μm. For example, the thickness of the cathode conductor layer may be about 6 μm to about 14 μm. For example, the thickness of the cathode conductor layer may be about 6 μm to about 13 μm. For example, the thickness of the cathode conductor layer may be about 6 μm to about 12 μm. For example, the thickness of the cathode conductor layer may be about 6 μm to about 11 μm. For example, the thickness of the cathode conductor layer may be about 6 μm to about 10 μm.

As used herein, the "solid electrolyte" refers to an electrolyte existing in a state of maintaining a predetermined shape at room temperature and having ionic conductivity and/or electrical conductivity. The solid electrolyte may be an electrolyte having not electrical conductivity but ionic conductivity, or may be an electrolyte having both ionic conductivity and electrical conductivity.

The mixed conductor may include an inorganic metal compound. Here, the term "inorganic metal compound" refers to a compound including a metal element, a transition metal element, a lanthanum group element, an actinium group element, or a combination thereof. For example, the inorganic metal compound refers to a compound not including a C—H bond.

The mixed conductor may include a lithium metal compound. For example, the mixed conductor may include a compound represented by Formula 1 below.

  Formula 1

In Formula 1, M includes a transition metal element of Groups 3 to 12; a metalloid element of Groups 13 to 16, a metal element in the Periodic Table, or a combination thereof; X includes a nonmetallic element of Groups 15 to 17 in the Periodic Table; and x satisfies 0<x<5, y satisfies 0<y<6, and z satisfies 0<z<15.

In Formula 1, M includes Sc, Ti, V, Cr, Mn, Fe, Co, Ni, Cu, Zn, Y, La, Zr, Nb, Mo, Tc, Ru, Rh, Pd, Ag, Cd, Hf, Ta, W, Re, Os, Ir, Pt, Au, Hg, Ac, Rf, Db, Sg, Bh, Hs, Mt, B, Si, Ge, As, Se, Sb, Te, Al, Ga, In, Sn, Tl, Pb, Bi, Po, or a combination thereof.

In Formula 1, X includes N, P, O, S, F, Cl, Br, I, At, or a combination thereof.

For example, the mixed conductor may include a lithium transition metal oxide, a lithium metalloid oxide, a lithium metal oxide, or a combination thereof.

For example, the mixed conductor includes $Li_4Ti_5O_{12}$, $LiCoO_2$, or $LiFePO_4$.

The mixed conductor may not include an organic compound (i.e. organic-compound-free). For example, the mixed conductor may not include a carbon-based material. Since the mixed conductor does not include a carbon-based material, the generation of carbon dioxide ($CO_2$) by the side reaction with oxygen at the cathode conductor layer during the charging and discharging of the lithium-air battery may be prevented. Therefore, the charging and discharging characteristics and stability of the lithium-air battery may be improved.

The solid electrolyte may be a solid at 50° C. or lower. For example, the solid electrolyte may be a solid at 45° C. or lower. For example, the solid electrolyte may be a solid at 40° C. or lower. For example, the solid electrolyte may be a solid at 35° C. or lower. For example, the solid electrolyte may be a solid at 30° C. or lower. The solid electrolyte may be a solid at 25° C. or lower, for example, at about 20° C. to 25° C. The solid electrolyte may include a polymer and may be a solid at room temperature, for example, about 20° C. That is, the solid electrolyte may be a solid polymer electrolyte that is a solid at room temperature.

Since the solid electrolyte is a solid, the structure of the lithium-air battery may be simplified, and leakage may not occur, so that the stability of the lithium-air battery.

The solid electrolyte may be a material whose reduction potential is less than the reduction potential of oxygen. Since the reduction potential of the solid electrolyte is less than the reduction potential of oxygen, electrons transferred from the cathode conductor layer may preferentially undergo a reduction reaction with oxygen to form a discharge product. As a result, the decomposition of the solid electrolyte may be suppressed.

The mixed conductor may have an ionic conductivity of about $1\times10^{-6}$ Siemens per centimeter (S/cm) to about $1\times10^{-1}$ S/cm at 25° C. The mixed conductor may have an ionic conductivity of about $1\times10^{-5}$ S/cm to about $1\times10^{-1}$ S/cm at 25° C., so as to transfer lithium ions in the lithium-air battery. For example, the mixed conductor may have an ionic conductivity of about $1\times10^{-5}$ S/cm to about $1\times10^{-2}$ S/cm at 25° C. For example, the mixed conductor may have an ionic conductivity of about $1\times10^{-5}$ S/cm to about $1\times10^{-3}$ S/cm at 25° C. For example, the mixed conductor may have an ionic conductivity of about $1\times10^{-4}$ S/cm to about $1\times10^{-3}$ S/cm at 25° C. For example, the mixed conductor may have an ionic conductivity of about $2\times10^{-4}$ S/cm to about $1\times10^{-3}$ S/cm at 25° C. For example, each of the mixed conductor and the solid electrolyte may have an ionic conductivity of about $5\times10^{-4}$ S/cm to about $1\times10^{-3}$ S/cm at 25° C.

The solid electrolyte may have an ionic conductivity of about $1\times10^{-8}$ Siemens per centimeter (S/cm) to about $1\times10^{-1}$ S/cm at 25° C. The solid electrolyte may have an ionic conductivity of about $1\times10^{-7}$ S/cm to about $1\times10^{-2}$ S/cm at 25° C., so as to transfer lithium ions in the lithium-air battery. For example, the solid electrolyte may have an ionic conductivity of about $1\times10^{-6}$ S/cm to about $1\times10^{-3}$ S/cm at 25° C. For example, the solid electrolyte may have an ionic conductivity of about $1\times10^{-5}$ S/cm to about $1\times10^{-3}$ S/cm at 25° C. For example, the solid electrolyte may have an ionic conductivity of about $1\times10^{-4}$ S/cm to about $1\times10^{-3}$ S/cm at 25° C. For example, the solid electrolyte may have an ionic conductivity of about $2\times10^{-4}$ S/cm to about $1\times10^{-3}$ S/cm at 25° C. For example, the solid electrolyte may have an ionic conductivity of about $5\times10^{-4}$ S/cm to about $1\times10^{-3}$ S/cm at 25° C.

The mixed conductor may have an electrical conductivity of greater than $1\times10^{-6}$ S/cm to about 1 S/cm. For example the mixed conductor may have an electrical conductivity of about $1\times10^{-5}$ S/cm to about $1\times10^{-1}$ S/cm. For example the mixed conductor may have an electrical conductivity of about $1\times10^{-4}$ S/cm to about $1\times10^{-1}$ S/cm. For example, the mixed conductor may have an electrical conductivity of about $1\times10^{-3}$ S/cm to about $1\times10^{-2}$ S/cm. For example, the mixed conductor may have an electrical conductivity of about $1\times10^{-5}$ S/cm to about 1 S/cm. The mixed conductor has the above electrical conductivity, so as to allow the movement of electrons in the cathode conductor layer. Therefore, the cathode conductor layer functions as a path of lithium ions and electrons.

The solid electrolyte may have an electrical conductivity of about $1\times10^{-8}$ or less, for example, about $1\times10^{-12}$ Siemens per centimeter to about $1\times10^{-8}$ Siemens per centimeter. For example, the solid electrolyte may have an electrical conductivity of about $1\times10^{-9}$ S/cm or less or about $1\times10^{-12}$ Siemens per centimeter to about $1\times10^{-9}$ Siemens per centimeter. The solid electrolyte has the above electrical conductivity, so as to suppress the movement of electrons from the cathode conductor layer. Therefore, the cathode junction layer functions as a path of lithium ions.

The solid electrolyte may be a solvent-free electrolyte. For example, the solid electrolyte may be a solid polymer electrolyte only including a polymer and a lithium salt. The solid electrolyte may not include a solvent, so as to prevent a problem of a side reaction and leakage due to a solvent.

The solvent-free electrolyte is distinguished from a polymer gel electrolyte in which a solid polymer includes a small amount of solvent. For example, the polymer gel electrolyte may have further improved ionic conductivity because an ionically conductive polymer includes a small amount of solvent.

According to an embodiment, a lithium-air battery includes: a composite cathode including a cathode conductor layer and a cathode junction layer, wherein the cathode conductor layer includes a mixed conductor having ionic conductivity and electrical conductivity, and the cathode junction layer is adjacent to the cathode conductor layer and includes a solid electrolyte; an anode; and an oxygen-blocking film adjacent to the anode, wherein the cathode junction layer has lithium-ion conductivity. The lithium-air battery includes the aforementioned composite cathode, so as to improve cycle characteristics.

The lithium-air battery may exhibit a reaction mechanism as shown in Reaction Formula 1 below:

$$4Li+O_2 \leftrightarrow 2Li_2O \quad E=2.91V$$

$$2Li+O_2 \leftrightarrow Li_2O_2 \quad E=3.10V. \hspace{2cm} \text{Reaction Formula 1}$$

During discharging, lithium derived from the anode meets oxygen introduced from the cathode to generate lithium oxide, and oxygen is reduced (oxygen reduction reaction ("ORR")). Further, conversely, during charging, lithium oxide is reduced, and oxygen is generated by oxidation (oxygen evolution reaction ("OER")). Meanwhile, during discharging, $Li_2O_2$ is precipitated in the pores of the cathode, and the capacity of the lithium-air battery increases as the area of the electrolyte in contact with oxygen in the cathode increases.

Contents of the aforementioned composite cathode may be applied the same manner.

The cathode junction layer may be interposed between the oxygen-blocking film and the cathode conductor layer. In the lithium-air battery, the cathode junction layer may be interposed between the oxygen-blocking film and the cathode conductor layer, so that the interface resistance between the cathode conductor layer and the oxygen-blocking film is reduced, so as to improve the charging and discharging characteristics of the lithium-air battery may be improved. When the cathode junction layer has a low interface resistance to both the cathode conductor layer and the oxygen-blocking film, even though a new layer is added, the interface resistance therebetween may be reduced compared to when the cathode conductor layer and the oxygen-blocking film are in contact with each other. Further, when the cathode junction layer is interposed between the oxygen-blocking film and the cathode conductor layer, the decomposition of the oxygen-blocking film by the reduction reaction with electrons moving into the oxygen-blocking film is prevented.

The cathode conductor layer and the cathode junction layer may be disposed to be in contact with each other. The oxygen-blocking film may be disposed to be in contact with the cathode junction layer. Since the composite cathode has a structure of oxygen-blocking film/cathode junction layer/ cathode conductor layer, the cathode junction layer serves as a path of lithium ions, and the interface resistance between the cathode conductor layer and the oxygen-blocking film.

The cathode junction layer may be thinner than the oxygen-blocking film. When the cathode junction layer is thicker than the oxygen-blocking film, it may be difficult to reduce the interface resistance between the cathode conductor layer and the oxygen-blocking film due to an increase of the film resistance of the cathode junction layer itself.

The cathode conductor layer may include a mixed conductor, the cathode junction layer may include a solid electrolyte, the mixed conductor may include an inorganic electrolyte represented by Formula 1 above, and the solid electrolyte may include a polymer electrolyte, an inorganic electrolyte, an organic-inorganic composite electrolyte, or a combination thereof.

For example, the polymer electrolyte may include an ionically conductive polymer. For example, the ionically conductive polymer may include polyethylene oxide ("PEO"), polyvinyl alcohol ("PVA"), polyvinyl pyrrolidone ("PVP"), Li-substituted Nafion®, or a combination thereof, but is not limited thereto. Any suitable material that may be used as an ionically conductive polymer may be used.

For example, the inorganic electrolyte may include a glassy or amorphous electrolyte, a ceramic electrolyte, a glass-ceramic electrolyte, or a combination thereof.

For example, the organic-inorganic composite electrolyte may include an electrolyte in which an organic electrolyte and an inorganic electrolyte are combined with each other. However, the organic-inorganic composite electrolyte is not limited thereto, and any suitable organic-inorganic composite electrolyte may be used. For example, the organic-inorganic composite electrolyte may include an electrolyte in which an ionically conductive polymer is combined with an inorganic electrolyte.

The cathode junction layer may include a solid electrolyte and a lithium salt. The solid electrolyte is described above, and the lithium salt may include $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are each 1 to 30), LiF, LiBr, LiCl, LiI, $LiB(C_2O_4)_2$, lithium bis(oxalato) borate ("LiBOB"), lithium bis(trifluoromethanesulfonyl)Imide ("LiTFSi"), $LiNO_3$, or a combination thereof, but is not limited thereto. Any suitable lithium salt may be used.

The content of the lithium salt may be about 0.001% by weight to about 30% by weight, based on the total weight of the solid electrolyte, but is not limited thereto, and may be any suitable range so long as the electrolyte may effectively transfer lithium ions during charging and discharging processes.

As a current collector, a porous structure having a mesh shape may be used to accelerate the diffusion of oxygen, and a porous plate including stainless steel, nickel, aluminum, or the like may be used. However, the current collector is not limited thereto, and any suitable current collector may be used. The current collector may be coated with an oxidation-resistant metal or an alloy coating film to prevent oxidation.

A gas diffusion layer may be additionally disposed between the current collector and the anode conductor layer. The gas diffusion layer may include a porous carbon-based material, a porous metal, or the like, but is not limited thereto, and any suitable material that may be used in a conductive gas diffusion layer may be used. For example, the porous carbon-based material is a carbon fiber nonwoven fabric or the like. A conductive carbon-based gas diffusion layer may have a density less than the density of metal included in a gas diffusion layer, and the energy density of the lithium-air battery may be further improved.

The anode may be, for example, a thin film including lithium metal or lithium metal alloy. The lithium metal alloy may be, for example, an alloy of lithium and aluminum, tin, magnesium, indium, calcium, titanium, or vanadium.

A separator may be disposed between the cathode and the anode. The composition of the separator is not limited so long as it may be used in the operation range of the lithium-air battery. For example, the separator may include a polymer nonwoven fabric, such as a polypropylene-based nonwoven fabric or a polyphenylene sulfide-based nonwoven fabric, a porous film of an olefin resin, such as polyethylene or polypropylene, or a combination thereof.

The oxygen-blocking film may be oxygen-impermeable. The oxygen-blocking film, which is a lithium ion-conductive solid electrolyte film may serve as a protective film for allowing impurities such as oxygen included in the cathode electrolyte not to react with the lithium metal anode. As the material of the lithium ion-conductive solid electrolyte film that is oxygen-impermeable, an inorganic material including lithium ion-conductive glass, lithium ion-conductive crystals (ceramic or glass-ceramic) or a mixture thereof may be exemplified. However, the present disclosure is not limited thereto, any suitable solid electrolyte film having lithium-ion conductivity, impermeable to oxygen, and protecting the anode may be used.

Meanwhile, considering chemical stability, the lithium ion-conductive solid electrolyte film may include, for example, oxide. When the lithium ion-conductive solid electrolyte film includes a large amount of lithium ion conductive crystals, high ionic conductivity is obtained, so that, for example, the lithium ion-conductive solid electrolyte film may include lithium ion conductive crystals in an amount of 50 weight percent (wt %) or greater, 55 wt % or greater, or 60 wt % or greater, based on the total weight of the solid electrolyte film.

As the lithium ion-conductive crystals, crystals having a perovskite structure having lithium-ion conductivity, such as $Li_3N$, LISICONs, and $La_{0.55}Li_{0.35}TiO_3$, crystals having a sodium super ionic conductor ("NASICON") type structure, such as $LiTi_2P_3O_{12}$, or glass-ceramic crystals precipitating these crystals may be used.

As the lithium ion-conductive crystals, $Li_{1+x+y}(Al, Ga)_x$ $(Ti, Ge)_{2-x}Si_yP_{3-y}O_{12}$ (wherein 0≤x≤1, 0≤y≤1, for example 0≤x≤0.4, 0<y≤0.6, or 0.1≤x≤0.3, 0.1<y≤0.4). In order for the lithium ion-conductive crystals to have high ionic conductivity, lithium ion-conductive crystals are required not to have grain boundaries that do not inhibit ion conduction. For example, since the glass-ceramic crystals have reduced or minimized pore or gain boundaries inhibiting ion conduction, the glass-ceramic crystals may have high ionic conductivity and good chemical stability.

Examples of the lithium ion-conductive glass-ceramic may include lithium-aluminum-germanium-phosphates ("LAGP"), lithium-aluminum-titanium-phosphates ("LATP"), and lithium-aluminum-titanium-silicon-phosphates ("LATSP").

For example, when mother glass having a composition of $Li_2O$—$Al_2O_3$—$TiO_2$—$SiO_2$—$P_2O_5$ is crystallized by heat treatment, the main crystalline phase thereof is $Li_{1+x+y}Al_xTi_{2-x}Si_yP_{3-y}O_{12}$ (0≤x≤1, 0≤y≤1). In this case, x and y is for example, 0≤x≤0.4, 0<y≤0.6, or 0.1≤x≤0.3, 0.1<y≤0.4.

Here, the "pore or gain boundaries inhibiting ion conduction" refer to an ion conduction inhibiting material such as pore or gain boundaries reducing the conductivity of the entire inorganic material including lithium ion-conductive crystals to a value of ⅟₁₀ or less with respect to the conductivity of the lithium ion-conductive crystals themselves in the inorganic material.

For example, the oxygen-blocking film may include $Li_{1+x+y}Al_xTi_{2-x}Si_yP_{3-y}O_{12}$ (0≤x≤1, 0≤y≤1). Here, x and y are, for example, 0≤x≤0.4, 0<y≤0.6, 0.1≤x≤0.3, or 0.1<y≤0.4.

For example, the oxygen-blocking film may be a solid electrolyte film including $Li_{1+x+y}Al_x(Ti,Ge)_{2-x}Si_yP_{3-y}O_1$ (0≤x≤2, 0≤y≤3), for example, the LATP $Li_{1.4}Ti_{1.6}Al_{0.4}P_3O_{12}$.

The thickness of the oxygen-blocking film may be about 10 μm to about 30 μm. For example, the thickness of the oxygen-blocking film may be about 15 μm to about 30 μm. For example, the thickness of the oxygen-blocking film may be about 20 μm to about 30 μm. For example, the thickness of the oxygen-blocking film may be about 21 μm to about 30 μm. For example, the thickness of the oxygen-blocking film may be about 22 μm to about 30 μm. For example, the thickness of the oxygen-blocking film may be about 23 μm to about 30 μm. For example, the thickness of the oxygen-blocking film may be about 24 μm to about 30 μm. For example, the thickness of the oxygen-blocking film may be about 25 μm to about 30 μm. For example, the thickness of the oxygen-blocking film may be about 10 μm to about 25 μm. For example, the thickness of the oxygen-blocking film may be about 10 μm to about 20 μm. For example, the thickness of the oxygen-blocking film may be about 10 μm to about 19 μm. For example, the thickness of the oxygen-blocking film may be about 10 μm to about 18 μm. For example, the thickness of the oxygen-blocking film may be about 10 μm to about 17 μm. For example, the thickness of the oxygen-blocking film may be about 10 μm to about 16 μm. For example, the thickness of the oxygen-blocking film may be about 10 μm to about 15 μm.

An anode interlayer may be additionally disposed between the anode and the oxygen-blocking film. The anode interlayer may be introduced in order to prevent the side reaction occurring between the anode and the oxygen-blocking film.

The anode interlayer may include an anode solid electrolyte. The anode solid electrolyte refers to the solid electrolyte for the anode interlayer disposed between the anode and the oxygen blocking file. The anode solid electrolyte is, for example, polyethylene oxide ("PEO") doped with a lithium salt. Examples of the lithium salt may include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The lithium-air battery may be used for both primary and secondary batteries. The shape of the lithium-air battery is not limited thereto, and examples thereof may include a coin shape, a button shape, a sheet shape, a laminate shape, a cylinder shape, a flat shape, and a horn shape. The lithium-air battery may also be applied to large batteries for electric vehicles.

FIG. 1 schematically shows the structure of a lithium-air battery according to an embodiment. The lithium-air battery 10 includes a composite cathode 11 adjacent to a first current collector and including oxygen as an active material, an anode 15 adjacent to a second current collector 16 and including lithium, and an oxygen-blocking film 14 interposed between the composite cathode 11 and the anode 15. The composite cathode 11 includes a cathode conductor layer 12 and a cathode junction layer 13. The cathode junction layer 13 is interposed between the cathode conductor layer 12 and the oxygen-blocking film 14. The first current collector may also serve as a gas diffusion layer that is porous and capable of diffusing air. A pressing member 18 is disposed on the first current collector such that air is transferred to an air electrode. A case 17 made of an insulating resin material is interposed between the composite cathode 11 and the anode 15 to electrically separate the composite cathode and the anode. Air is supplied into an air inlet 19a and is discharged to the outside through an air outlet 19b. The lithium-air battery may be accommodated in a stainless steel reactor.

As used herein, the term "air" is not limited to atmospheric air, and may include a combination of gases including oxygen or pure oxygen gas. The broad definition of this term "air" may be applied to all applications, for example, air batteries, air electrodes, and the like.

The lithium-air battery may be manufactured as follows.

First, a mixed conductor, a binder, and a solvent may be mixed and then sintered to obtain a film type cathode conductor layer. Further, a solid electrolyte, a lithium salt, and a solvent may be mixed and then dried to obtain a film type cathode junction layer.

Next, an anode, which is a lithium metal thin film, is provided on the second current collector, an oxygen-blocking film is provided on the anode, and the cathode junction layer and the cathode conductor layer are sequentially disposed on the oxygen-blocking film. Then, a nickel (Ni)-mesh current collector is laminated on the cathode conductor layer, and a cell is fixed on the current collector by a pressing member such that air is transferred to an air electrode, thereby completing a lithium-air battery.

The case may be separated into a lower portion in contact with the anode and an upper portion in contact with the air electrode, and an insulating resin is interposed between the upper portion and the lower portion to electrically insulate the air electrode and the anode.

Hereinafter, the present disclosure will be described in more detail with reference to Examples and Comparative Examples. However, these examples are set forth to illustrate the present disclosure, and the scope of the present disclosure is not limited thereto.

EXAMPLES

Preparation of Structure of Oxygen-Blocking Film/Cathode Junction Layer/Cathode Conductor Layer Example 1: Preparation of Structure of Oxygen-Blocking Film/Cathode Junction Layer/Cathode Conductor Layer 2.02 grams (g) of polyethylene oxide ("PEO", molecular weight ("MW")=600,000, Aldrich, 182028) was dissolved in 100 milliliters (ml) of acetonitrile to obtain a PEO solution, and lithium bis(trifluoromethanesulfonyl)Imide ("LiTFSi") was added to the PEO solution at a molar ratio of PEO:Li=18:1, followed by stirring and dissolving, to obtain a polymer electrolyte composition for forming a cathode junction layer.

10 ml of the polymer electrolyte composition was disposed on an inorganic lithium ion conductor LICGC™ (a lithium-aluminum-titanium-phosphate ("LATP"), manufactured by Ohara Corporation, thickness: 250 micrometers (μm)), was spin-coated by rotating the inorganic lithium ion conductor at a rotation speed of 1000 revolutions per minute (rpm) for 60 seconds using a spin coater, was dried in a dry room at room temperature (20° C.) for 12 hours, and was then dried in vacuum at 50° C. for 2 hours, so as to prepare a structure of an oxygen-blocking film/a cathode junction layer where a cathode junction layer is formed on an oxygen-blocking film (a LATP).

The coating amount of the cathode junction layer was 0.0785 micrograms per square centimeter ($mg/cm^2$), and the thickness of the cathode junction layer was 1 μm.

Then, $Li_4Ti_5O_{12}$ powder ("LTO powder") was milled for 60 minutes by a ball milling machine, the LTO powder was mixed with a binder (B97) at a weight ratio of 7:3, and then the mixture was dissolved in an ethanol solvent to prepare a slurry. The slurry was sintered at a temperature of 800° C. for 60 minutes to prepare a film used for a cathode conductor layer.

The film for a cathode conductor layer was disposed on the prepared structure of an oxygen-blocking film/a cathode junction layer, and pressed to prepare a structure of an oxygen-blocking film/a cathode junction layer/a cathode conductor layer.

Comparative Example 1: Preparation of Structure of Oxygen-Blocking Film/Cathode Conductor Layer (1)

The film for a cathode conductor layer, prepared in Example 1, was disposed on an inorganic lithium ion conductor LICGC™ (a LATP, manufactured by Ohara Corporation, thickness: 250 μm), so as to a structure where an oxygen-blocking film and a cathode conductor layer are disposed in a state of having no cathode junction layer.

Comparative Example 2: Preparation of Structure of Oxygen-Blocking Film/Cathode Conductor Layer (2)

The film for a cathode conductor layer, prepared in Example 1, was disposed on an inorganic lithium ion conductor LICGC™ (a LATP, manufactured by Ohara Corporation, thickness: 250 μm), and sintered at 800° C. for 60 minutes, so as to a structure of an oxygen-blocking film/a cathode conductor layer.

Comparative Example 3: Preparation of Structure of Oxygen-Blocking Film/Au Current Collector Layer (3)

Au was sputtered on an inorganic lithium ion conductor LICGC™ (a LATP, manufactured by Ohara Corporation, thickness: 250 μm), so as to a structure of an oxygen-blocking film/an Au current collector layer.

Manufacture of Lithium-Air Battery

Example 2: Manufacture of Lithium-Air Battery

A copper foil was coated with brushed lithium metal to be prepared as an anode, and a 15 weight percent (wt %) $SiO_2$-PEO film was used as an anode interlayer in order to prevent an oxygen-blocking film LICGC™ (a LATP) from being in direct contact with lithium (Li). Here, the 15 wt % $SiO_2$-PEO film was prepared by the following process.

Polyethylene oxide (MW 600,000), nano silicon oxide ($SiO_2$), and LiTFSi were mixed with 100 ml of acetonitrile for 12 hours. The molar ratio of LiTFSi and polyethylene oxide was 1:18, and the content of $SiO_2$ in the $SiO_2$-PEO film was 15 wt %.

The lithium metal film and the anode interlayer are laminated to form a laminate, and the structure of oxygen-blocking film/cathode junction layer/cathode conductor layer, prepared in Example 1, was disposed on the laminate.

A carbon paper (available from SGL, 35 BA), as a gas diffusion layer, was disposed on the other side of the cathode conductor layer, and a nickel (Ni) mesh, as current collector, was disposed on the gas diffusion layer, so as to manufacture a lithium-air battery.

Comparative Example 4

A lithium-air battery was manufactured in the same manner as in Example 2, except that the structure of oxygen-blocking film/cathode conductor layer, prepared in Comparative Example 1, was used instead of the structure of oxygen-blocking film/cathode junction layer/cathode conductor layer, prepared in Example 1.

Comparative Example 5

A lithium-air battery was manufactured in the same manner as in Example 2, except that the sintered structure of oxygen-blocking film/cathode conductor layer, prepared in Comparative Example 2, was used instead of the structure of oxygen-blocking film/cathode junction layer/cathode conductor layer, prepared in Example 1.

Comparative Example 6

A copper foil was coated with brushed lithium metal to be prepared as an anode, and a 15 wt % $SiO_2$-PEO film was used as an anode interlayer in order to prevent an oxygen-blocking film LICGC™ (a LATP) from being in direct contact with lithium (Li). Here, the 15 wt % $SiO_2$-PEO film was prepared by the following process.

Polyethylene oxide (MW 600,000), nano silicon oxide ($SiO_2$), and LiTFSi were mixed with 100 ml of acetonitrile for 12 hours. The molar ratio of LiTFSi and polyethylene oxide was 1:18, and the content of $SiO_2$ in the $SiO_2$-PEO film was 15 wt %.

The lithium metal film and the anode interlayer are laminated to form a laminate, and the structure of oxygen-blocking film/Au current collector, prepared in Comparative Example 3, was disposed on the laminate, so as to manufacture an air-impermeable 2032 coin cell using this laminate.

Evaluation Example 1: Evaluation of Charging/Discharging Characteristics

Figure 2:
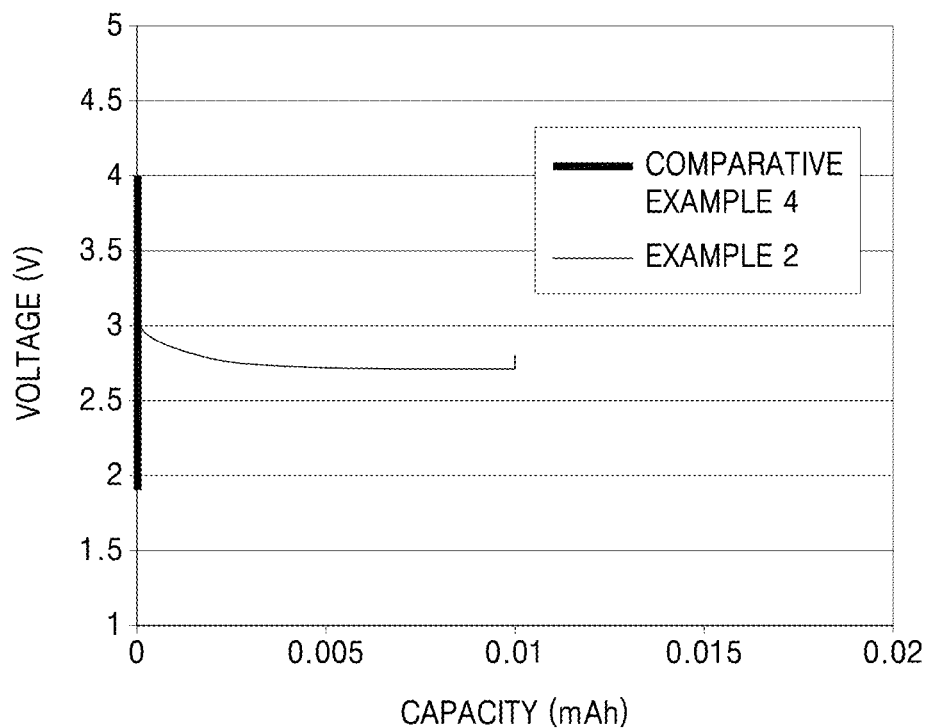
FIG. 2 is a graph of voltage (volts (V)) versus capacity (milliampere hours (mAh)) illustrating the initial charge/discharge profile of lithium-air batteries of Example 2 and Comparative Example 4.

Each of the lithium-air batteries manufactured in Example 2 and Comparative Example 4 was discharged to 1.7 volts (V) by a constant current of 0.001 milliamperes per square centimeter ($mA/cm^2$) under an oxygen atmosphere of 1 atmosphere (atm) at 60° C., and then a charging/discharging profile is shown in FIG. 2.

Figure 3:
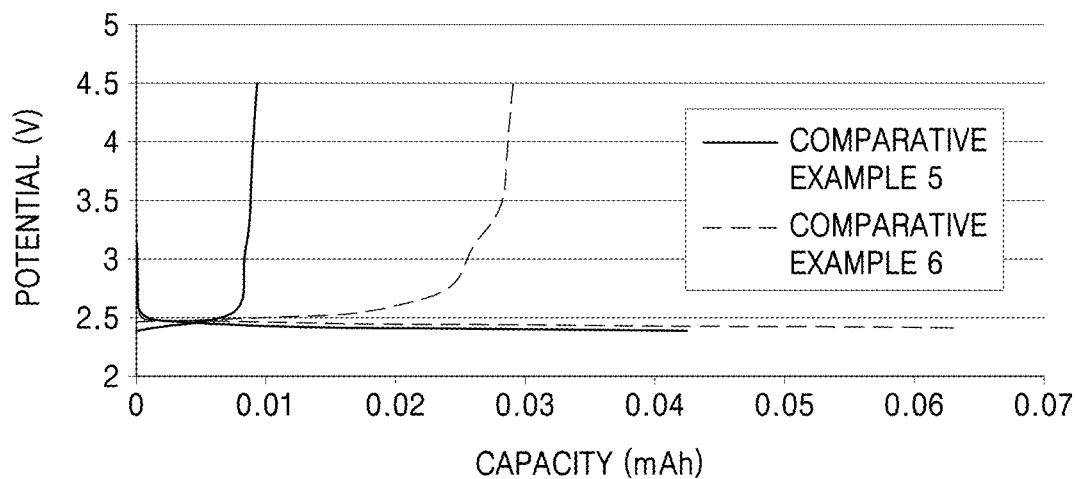
FIG. 3 is a graph of potential (V) versus capacity (mAh) illustrating the initial charge/discharge profile of lithium-air batteries of Comparative Examples 5 and 6.

Each of the coin cell manufactured in Comparative Example 6 and the lithium-air battery manufactured in Comparative Example 5 was charged and discharged in the range of 1.7 V to 4.2 V (vs. Li) once by a constant current of 0.001 $mA/cm^2$ under an oxygen atmosphere of 1 atm at 60° C., and then a charging/discharging profile is shown in FIG. 3.

As shown in FIG. 2, the lithium-air battery of Example 2 shows a normal discharge profile, but the lithium-air battery of Comparative Example 4 was not operated. This is thought to be the result of no lithium ion exchange occurring between the oxygen-blocking film and the cathode conductor layer.

Further, as shown in FIG. 3, the lithium-air battery of Comparative Example 5 shows an abnormal discharge profile. This is thought that, as shown in oxygen-free conditions of Comparative Example 6, electrons are transferred from the cathode conductor layer to the oxygen-blocking film, thereby causing a reduction decomposition reaction of the oxygen-blocking film.

As described above, in the lithium-air battery including a composite cathode not including a porous carbon material according to embodiments, the deterioration of a cathode material due to the side reaction of a carbon material and oxygen during charging and discharging processes may be prevented, so that charging and discharging characteristics and lifetime characteristics may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode, comprising:
a cathode conductor layer comprising a mixed conductor; and
a cathode junction layer adjacent to the cathode conductor layer, the cathode junction layer comprising a solid electrolyte,
wherein the mixed conductor has a lithium-ion conductivity and an electrical conductivity,
wherein the solid electrolyte has a lithium-ion conductivity,
wherein the cathode conductor layer is carbon-free, and
wherein the mixed conductor comprises a compound represented by Formula 1:

$$Li_xM_yX_z,\qquad\text{Formula 1}$$

wherein M comprises a transition metal element of Groups 3 to 12, a metalloid element of Groups 13 to 16, a metal of Groups 13 to 16 the Periodic Table, or a combination thereof,
X comprises a nonmetallic element of Groups 15 to 17 of the Periodic Table, and
x satisfies 0<x<5, y satisfies 0<y<6, and z satisfies 0<z<15, and
wherein the mixed conductor comprises $Li_4Ti_5O_{12}$.

2. The composite cathode of claim 1, wherein the cathode junction layer and the cathode conductor layer are in contact with each other.

3. The composite cathode of claim 1, wherein the cathode junction layer has a thickness which is less than a thickness of the cathode conductor layer.

4. The composite cathode of claim 1, wherein the cathode junction layer has a thickness of 0.1 micrometers to 5 micrometer.

5. The composite cathode of claim 1, wherein the cathode conductor layer has a thickness of 6 micrometer to 15 micrometer.

6. The composite cathode of claim 1, wherein the cathode conductor layer is a single layer.

7. The composite cathode of claim 1, wherein the solid electrolyte has an ionic conductivity of about $10^{-8}$ Siemens per centimeter or greater.

8. The composite cathode of claim 1, wherein the solid electrolyte has an electrical conductivity of about $10^{-8}$ Siemens per centimeter or less.

9. A lithium-air battery, comprising:
a composite cathode comprising a cathode conductor layer and a cathode junction layer, wherein the cathode conductor layer comprises a mixed conductor having a lithium-ion conductivity and an electrical conductivity, and
wherein the cathode junction layer is adjacent to the cathode conductor layer and includes a solid electrolyte;
an anode; and
an oxygen-blocking film adjacent to the anode,
wherein the cathode junction layer has a lithium-ion conductivity and an electrical conductivity,
wherein the cathode conductor layer is carbon-free, and
wherein the mixed conductor comprises a compound represented by Formula 1:

$$Li_xM_yX_z,\qquad\text{Formula 1}$$

wherein M comprises a transition metal element of Groups 3 to 12, a metalloid element of Groups 13 to 16, a metal of Groups 13 to 16 the Periodic Table, or a combination thereof,
X comprises a nonmetallic element of Groups 15 to 17 of the Periodic Table, and
x satisfies 0<x<5, y satisfies 0<y<6, and z satisfies 0<z<15.

10. The lithium-air battery of claim 9, wherein the cathode junction layer is disposed between the oxygen-blocking film and the cathode conductor layer.

11. The lithium-air battery of claim 9, wherein the cathode conductor layer and the cathode junction layer are in contact with each other.

12. The lithium-air battery of claim 9, wherein the oxygen-blocking film is in contact with the cathode junction layer.

13. The lithium-air battery of claim 9, wherein the cathode junction layer has a thickness which is less than a thickness of the oxygen-blocking film.

14. The lithium-air battery of claim 9, wherein the cathode junction layer has a thickness of 0.1 micrometer to 5 micrometer.

15. The lithium-air battery of claim 9, wherein the solid electrolyte comprises a polymer electrolyte, an inorganic electrolyte, an organic-inorganic composite electrolyte, or a combination thereof.

16. The lithium-air battery of claim 15, wherein the polymer electrolyte comprises an ionically conductive polymer.

17. The lithium-air battery of claim 15, wherein the inorganic electrolyte comprises a glassy electrolyte, a ceramic electrolyte, a glass-ceramic electrolyte, or a combination thereof.

18. The lithium-air battery of claim 15,
wherein the organic-inorganic composite electrolyte comprises an ionically conductive polymer and an inorganic electrolyte.
19. The lithium-air battery of claim 9,
wherein the anode comprises lithium or an alloy comprising lithium.
20. The lithium-air battery of claim 1,
wherein M comprises Ti, Co, Fe, or a combination thereof, and
X comprises O.
21. The composite cathode of claim 1,
wherein the mixed conductor comprises $LiCoO_2$.
22. The composite cathode of claim 1,
wherein the mixed conductor comprises $LiFePO_4$.

* * * * *